(12) United States Patent
Balko et al.

(10) Patent No.: US 8,453,127 B2
(45) Date of Patent: May 28, 2013

(54) SYSTEMS AND METHODS PROVIDING A TOKEN SYNCHRONIZATION GATEWAY FOR A GRAPH-BASED BUSINESS PROCESS MODEL

(75) Inventors: Sören Balko, Weinheim (DE); Thomas Hettel, Schwetzingen (DE)

(73) Assignee: SAP AG, Walldorf (DE)

( * ) Notice: Subject to any disclaimer, the term of this patent is extended or adjusted under 35 U.S.C. 154(b) by 484 days.

(21) Appl. No.: 12/886,042

(22) Filed: Sep. 20, 2010

(65) Prior Publication Data
US 2012/0072892 A1    Mar. 22, 2012

(51) Int. Cl.
*G06F 9/45*    (2006.01)
(52) U.S. Cl.
USPC ........... 717/144; 717/112; 717/140; 717/143; 717/151
(58) Field of Classification Search
None
See application file for complete search history.

(56) References Cited

U.S. PATENT DOCUMENTS

| | | | |
|---|---|---|---|
| 5,625,784 A | 4/1997 | Purcell | |
| 6,253,193 B1 * | 6/2001 | Ginter et al. | 705/57 |
| 6,336,135 B1 * | 1/2002 | Niblett et al. | 709/215 |
| 6,389,402 B1 * | 5/2002 | Ginter et al. | 705/51 |
| 6,601,233 B1 * | 7/2003 | Underwood | 717/102 |
| 6,615,166 B1 * | 9/2003 | Guheen et al. | 703/27 |
| 6,618,506 B1 | 9/2003 | Auerbach et al. | |
| 7,272,820 B2 * | 9/2007 | Klianev | 717/109 |
| 7,669,187 B2 * | 2/2010 | Liu et al. | 717/124 |
| 7,818,750 B2 * | 10/2010 | Dunki et al. | 718/106 |
| 7,954,091 B2 * | 5/2011 | Li et al. | 717/135 |
| 8,352,909 B2 * | 1/2013 | Aggarwal et al. | 717/109 |
| 2006/0259740 A1 | 11/2006 | Hahn et al. | |
| 2009/0031280 A1 * | 1/2009 | Koehler | 717/104 |
| 2010/0088251 A1 * | 4/2010 | Aggarwal et al. | 705/500 |
| 2010/0107164 A1 * | 4/2010 | Koskimies et al. | 718/100 |
| 2011/0055770 A1 * | 3/2011 | Hed et al. | 715/854 |

FOREIGN PATENT DOCUMENTS

| | | |
|---|---|---|
| WO | 98/38791 A2 | 9/1998 |
| WO | 2006/071947 A1 | 7/2006 |

OTHER PUBLICATIONS

Title: From UML Statecharts and Collaboration Diagrams to ColouredPetri Nets Models:A Graph Transformation based Approach for modelling and analysis of business processes in virtual enterprises, author: Raida ElMansouril, et al, source: IEEE, dated: Dec. 2009.*
Title: A Graphical Notation for Modeling Complex Events in Business Processes, author: Gero Decker, source: IEEE, dated: Oct. 2007.*
"European Search Report", dated Oct. 17, 2011, for European Application No. 07869459.3-2211 / 2097808, 4pgs.

* cited by examiner

*Primary Examiner* — Chameli Das
(74) *Attorney, Agent, or Firm* — Buckley, Maschoff & Talwalker LLC (57) ABSTRACT

According to some embodiments, a token synchronization gateway may be recognized in a graph-based business process model, such as a business process modeling notation model. A number of upstream artifacts located upstream from the token synchronization gateway may then be identified in the business process modeling notation model. In addition, a final artifact may be identified directly in front of the token synchronization gateway. The token synchronization gateway may then be compiled into code that will be executed at runtime to perform a synchronization process. The synchronization process may, for example, include handling tokens $T_1$ through $T_n$ to synchronize the upstream artifacts, with each token being associated with one of the n upstream artifacts.

16 Claims, 7 Drawing Sheets

SYSTEMS AND METHODS PROVIDING A TOKEN SYNCHRONIZATION GATEWAY FOR A GRAPH-BASED BUSINESS PROCESS MODEL

FIELD

Some embodiments relate to graph-based business process models. More specifically, some embodiments are associated with a token synchronization gateway for a graph-based business process model.

BACKGROUND

A user, such as a business analyst, may use a graph-based business process language, such as Business Process Modeling Notation ("BPMN"), to create a model for a business process. Some examples of BPMN are provided by the 1.2 and 2.0 Specifications available from the Business Process Management Initiative of the Object Management Group. As compared to other process languages, such as the Business Process Execution Language ("BPEL"), BPMN may cover a greater range of workflow patterns (and provide improved expressiveness) and may also simplify modeling for non-technical audiences, such as business people. This simplification is, in some cases, associated with reduced technical constraints as compared to the restrictions imposed by other business process languages. For example, BPMN allows for modeling non block-structured flows where model entities (e.g., activities, gateways, and events) may be arbitrarily interconnected. As result, BPMN may closely align with how domain experts (e.g., non-IT professionals including business analysts) conceive of and/or communicate business processes.

Even though a wide range of workflow patterns are supported, BPMN may still have some limitations. For example, BPMN supports a "thread split" pattern, where one thread is split into a number of concurrent threads that each follow the same control flow. This can be achieved, for example, using Multiple Instances ("MI") and/or Loop activities. Note that the same result might also be achieved using basic modeling elements such as an AND-split or inclusive OR-split paired with an XOR merge. Once a thread is split into a number of concurrent threads performing the same control flow, they may be merged back together when the number of threads was pre-determined and known at design-time. In some cases, however, the number of concurrent threads might be unknown until runtime and may, in some cases, depend on input data. In such a situation, in may be impractical to use BPMN constructs to merge the threads. For example, gateways (e.g., AND, XOR, and OR gateways) could be used to merge threads, but in this case all threads execute the same flow control (and, therefore, arrive at the same incoming edge of the gateway). As AND and OR gateways synchronize threads arriving at different sequence flow connectors (executing a different flow of control), they might lead to an erroneous execution of processes (and may also prevent processes from being terminated properly, taking up resources and even interfering with other process instances). For example, it may lead to a situation associated with a lack of synchronization.

Accordingly, methods and mechanisms for automatically and efficiently handling concurrent threads may be provided in association with some embodiments described herein.

DETAILED DESCRIPTION

Figure 1:
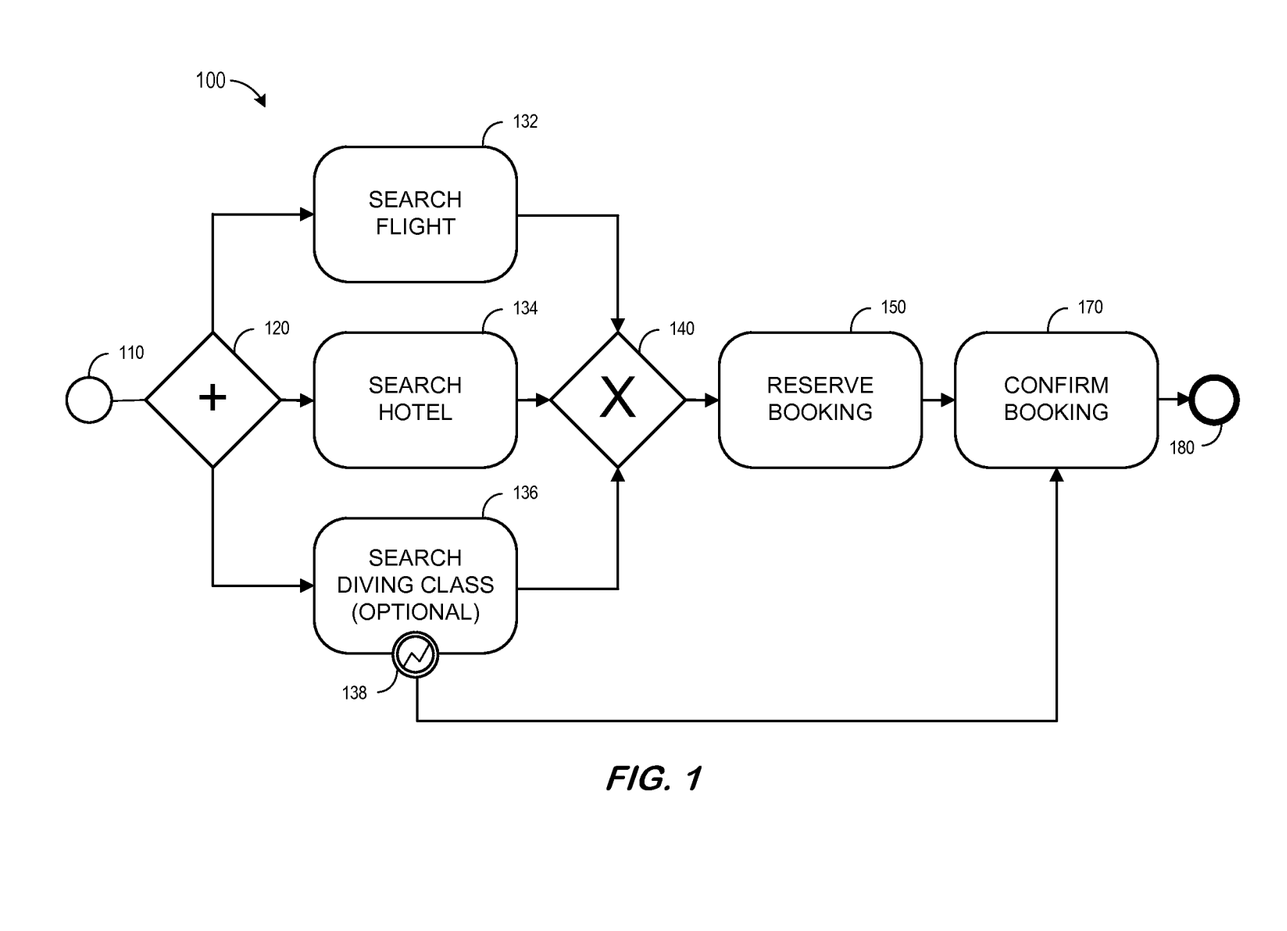
FIG. 1 is a block diagram of an example of a business process modeling notation model.

The BPMN standard provides a graphical notation to specify a business process in a business process diagram based on a flowchart-like representation. Note, however, the embodiments described herein may apply to other graph-based business process languages. A user, such as a business analyst, may use a Graphical User Interface ("GUI") or other design time tool to define and/or adjust flow objects in a diagram or model. Specifically, the user may connect flow objects to form certain patterns (e.g., sequences and/or parallel branches). For example, FIG. 1 is a block diagram of a BPMN model 100 that might be associated with, for example, a vacation booking business process. The model 100 includes a start event 110 flow object that acts as a trigger to initiate the business process.

Note that BPMN implicitly supports a "thread split" pattern, where one thread is split into a number of concurrent threads that each follow the same control flow (each of the concurrent threads may trigger or execute the same downstream BPMN entities). That is, one can use other BPMN artifacts to implement the behavior of a "thread split" pattern (but there may be no single BPMN entity for that pattern). In the example of FIG. 1, the joint booking of an airline flight, a hotel room, and (optionally) a diving course may be supported. In this case, a gateway 120 may split the process into three concurrent threads. In particular, a first thread might execute a search flight activity 132, a second thread might execute a search hotel activity 134, and a third thread might execute a search diving class activity 136 (all in parallel). An exclusive gateway 140 may join these three activities to a reserve booking activity 150 where a traveler may review the results of the searches. That is, the three parallel threads may be merged into a single branch that starts with the reserve booking activity 150. Note that the reserve booking activity 150 is executed multiple times (once for each booking item). Next, a confirm booking activity 170 may be executed, and, finally, an end event 180 may represent the result of the process. Note that the confirm booking activity 170 is only to be executed a single time, such as by confirming the three booking to some travel agency.

Once a thread is split into a number of concurrent threads performing the same control flow, they may only be merged again when the number of threads was pre-determined and known at design-time. Note that one may distinguish (1) merging control flow branches, which happens at the XOR gateway, and (2) synchronizing threads which is not automatically done by the XOR gateway. That is, tokens from multiple branches may well be merged to end up on the same branch, but once those tokens are on the same branch there is no way of synchronizing them (e.g., and ending up with only a single thread). In some cases, however, the number of concurrent threads might be unknown until runtime. For example, an error element 138 associated with the search diving class activity 136 may result in only two concurrent threads being executed. In such a situation, in may be impractical to use BPMN constructs to merge the threads.

Accordingly, methods and mechanisms for automatically and efficiently handling concurrent threads may be provided in association with some embodiments described herein. In particular, some embodiments described herein introduce a dedicated "token synchronization" gateway to flexibly synchronize a varying number of tokens from a single inbound branch of a BPMN model. The token synchronization gateway may, for example, synchronize multiple tokens from upstream control flow branches and pass a single token to an outbound branch.

Figure 2:
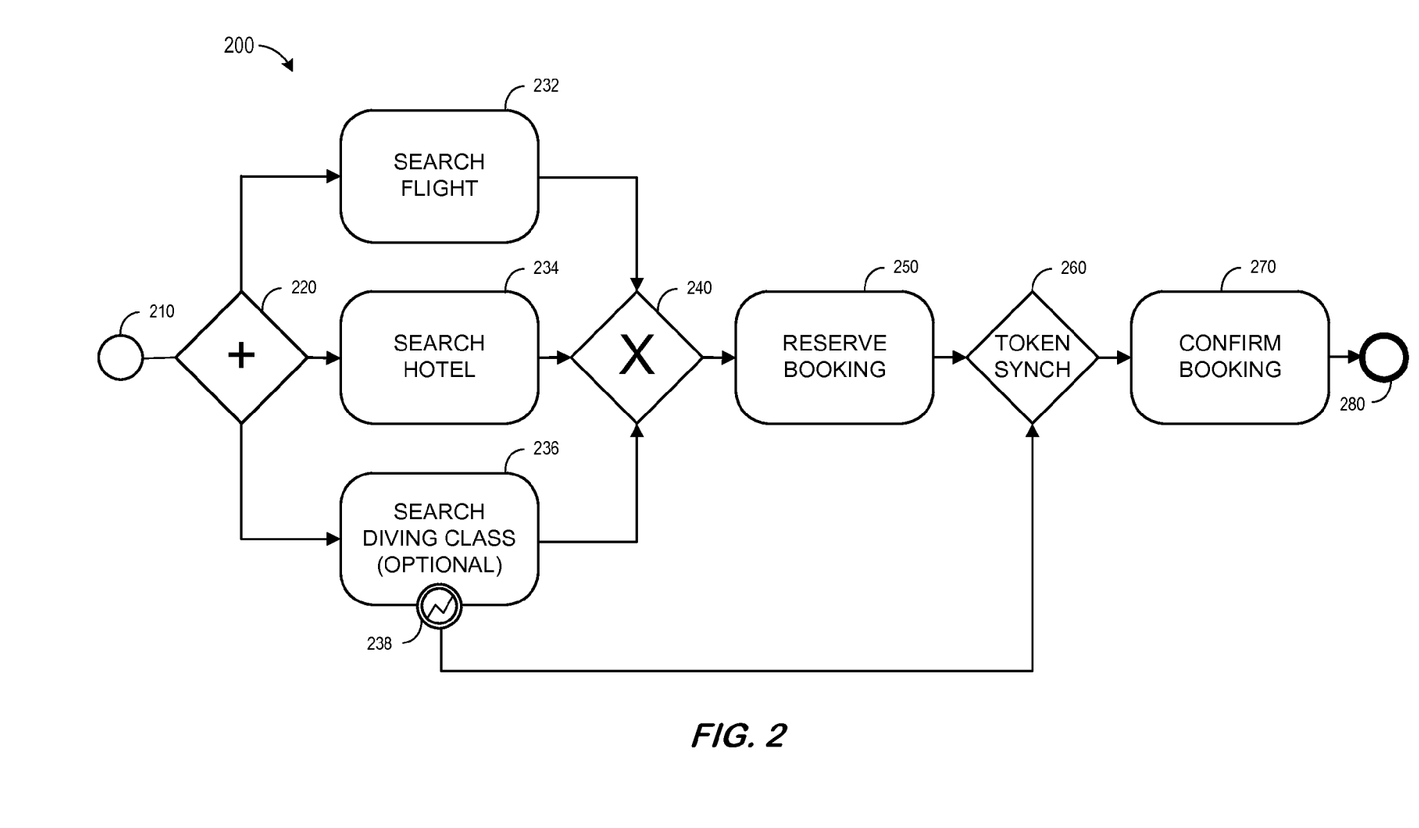
FIG. 2 is a block diagram of an example of a business process modeling notation model including a token synchronization gateway according to some embodiments.

FIG. 2 is a block diagram of an example of a BPMN model including a token synchronization gateway according to some embodiments. As before, the model 200 includes a start event 210 flow object and a parallel spilt gateway 220 (e.g., an AND split gateway) that may split the process into three concurrent threads. In particular, a first thread might execute a search flight activity 232, a second thread might execute a search hotel activity 234, and a third thread might execute a search diving class activity 236 (all in parallel). An exclusive gateway 240 may join these three activities to a reserve booking activity 250 where a traveler may review the results of the searches. Note that the exclusive XOR gateway merely redirects the threads from the three parallel branches to a single branch (and no synchronization of the thread occurs). According to this embodiment, a token synchronization gateway 260 may be provided between the reserve booking activity and a confirm booking activity 270 (and, finally, an end event 280 may represent the result of the process). Note that the reserve booking activity 250 is to be executed three times (e.g., for flight, hotel, and diving class) while the confirm booking activity 270 should be executed only once. A purpose of the token synchronization gateway may be associated with execution of the of the reserve booking activity 150 as many times as there are booking items (which may vary as when a search for a diving class fails for some reason) and execution of the downstream confirm booking activity 170 (and the end event 180 further downstream only a single time.

Figure 3:
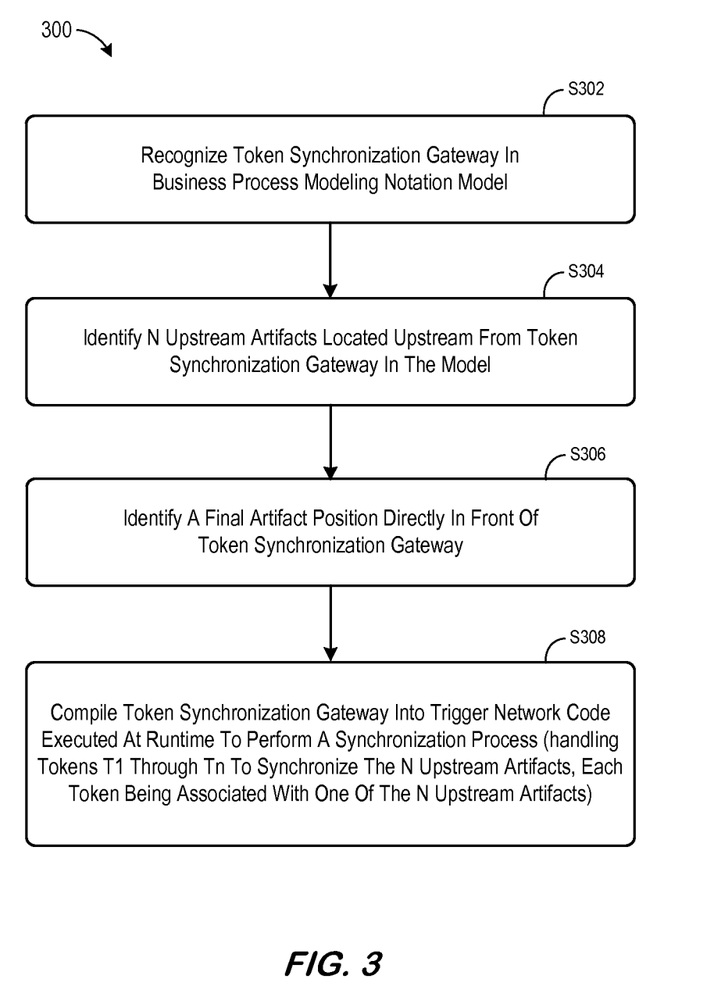
FIG. 3 is a flow diagram of a compilation process in accordance with some embodiments.

The token synchronization gateway 260 may flexibly synchronize a varying number of tokens from a single inbound branch of a BPMN model. The token synchronization gateway 260 may, for example, synchronize multiple tokens from upstream control flow branches and pass a single token to an outbound branch. FIG. 3 is a flow diagram of a compilation process 300 where a process model is translated into executable binary form in accordance with some embodiments. In particular, the compilation process 300 is a flow diagram illustrating where the process model is translated into binary code for deployment into an application server. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S302, a token synchronization gateway may be recognized in a graph-based business process model, such as a BPMN model. For example, a compiler might recognize the token synchronization gateway in a BPMN. At S304, n "upstream" artifacts located upstream from the token synchronization gateway may be identified in the BPMN model. As used herein, an artifact is upstream from a token synchronization gateway when it occurs before the gateway in the process. In the example of FIG. 2, three upstream artifacts may be identified (associated with flight, hotel, and diving class). Note that the complete set of upstream artifacts may include the start event 210, the parallel split gateway 220, the search flight activity 232, the search hotel activity 234, the search diving class activity 236, and the exclusive merge gateway 250. The reserve booking activity 250 may, despite being upstream of the token synchronization gateway, be classified as a "final" artifact. According to some embodiments, the identification of upstream artifacts is associated with a depth-first search algorithm graph analysis.

At S306, a "final" artifact, directly in front of the token synchronization gateway, may be identified. In the example of FIG. 2, the final artifact would be located after the reserve booking activity 250 is completed. At S308, the token synchronization gateway may be compiled into code to be executed at runtime to perform a synchronization process. Note that embodiments may be associated with various algorithms based on set theory, including algorithms associated with a Rete network. The synchronization process may include, for example, the handling of tokens $T_1$ through $T_n$ to synchronize the n upstream artifacts, each token being associated with one of the n upstream artifacts. In the example of FIG. 2, three tokens may be handled, one for each of the flight, hotel, and diving class artifacts.

Some embodiments described herein may be implemented on top of a rule-based Business Process Management ("BPM") runtime where process model entities are mapped to Event-Condition-Action ("ECA") rules acting on top of status variables. For a token synchronization gateway, a "Scope" status variable might denote a scope instance. A "Token" status variable might represent tokens at distinct positions within a control flow (notably, upstream of the token synchronization gateway, directly on its inbound edge, that is the final artifact, or downstream). A "Synchronization" status variable might act as a temporary helper variable to represent that a first token has arrived at the gateway's inbound branch.

Referring again to FIG. 2, recall that the reserve booking activity 250 is to be executed three times (e.g., for flight, hotel, and diving class) while the confirm booking activity 270 should be executed only once. According to some embodiments, the token synchronization gateway 260 may implement an "lazy" or "eager" synchronization behavior. In the lazy approach, the synchronization will only be complete when all upstream artifacts have been completed (e.g., after all of the flight, hotel, and diving reservations are complete). In the eager approach, the synchronization is complete after any upstream artifact is completed (e.g., after one of the flight, hotel, and diving reservations is. complete). If the synchronization is complete, (1) a single token is passed to the downstream control flow branch and (2) no further tokens may be passed downstream.

In the lazy approach, an initial first rule (e.g., "synchronize") may create a new synchronizer instance for this scope and place a new token on the token synchronization gateway's outbound branch when all upstream tokens in the scope have reached the position directly at the inbound edge of the token synchronization gateway (and there is not already a synchronizer instance for this scope). Other rules may "swallow" tokens as upstream artifacts complete and/or reset as appropriate. Note that when there are multiple tokens in the "final" artifact and no tokens in any of the upstream positions, one of the "final" tokens may be passed to the outbound connector (downstream branch) and all other "final" tokens may be deleted.

Figure 4:
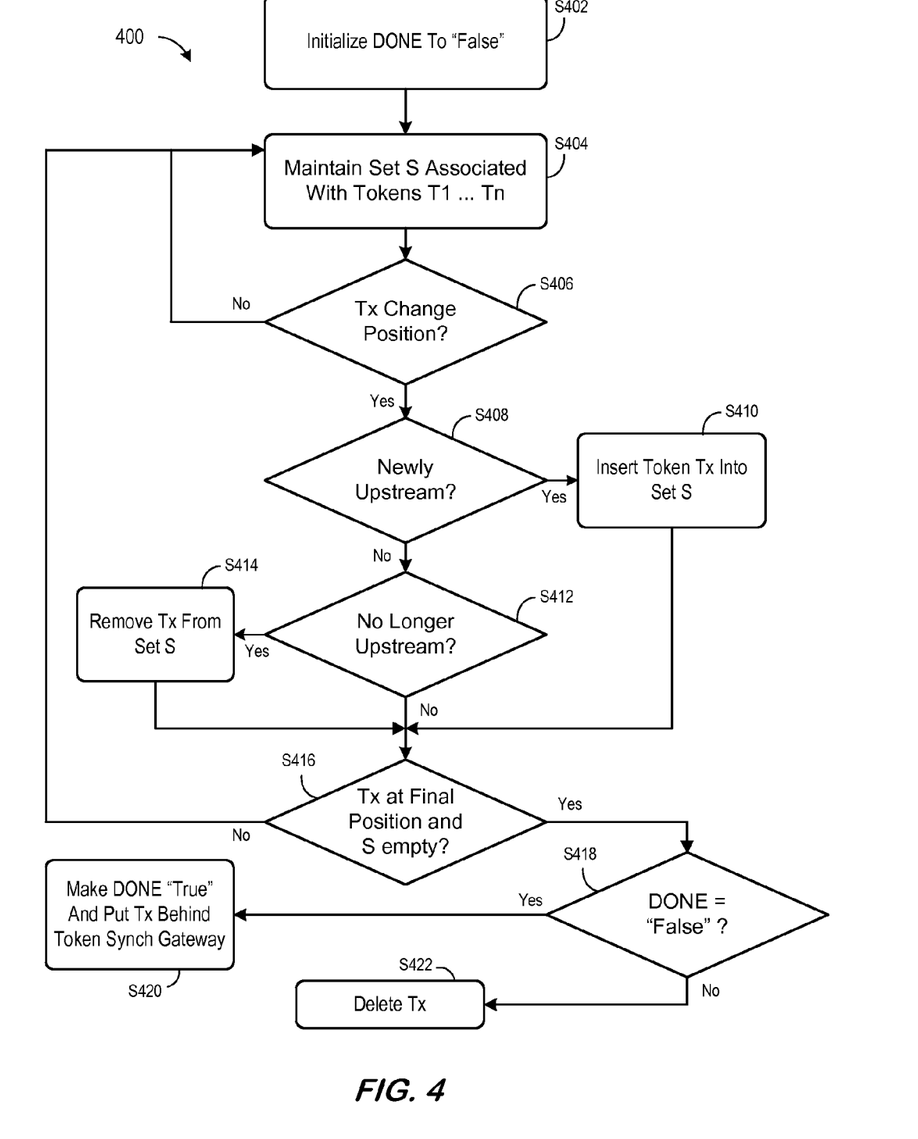
FIG. 4 is a flow diagram of a lazy process according to some embodiments.

For example, FIG. 4 is a flow diagram of an lazy process 400 according to some embodiments. In particular, the process 400 may be associated with the result of the compilation process 300 and may illustrate the corresponding process binary or the instructions performed by the process binary at runtime. That is, the handling of the tokens may result in an indication that the token synchronization gateway is done only after all upstream tokens are completed.

At S402, a DONE Boolean variable may be initialized to false. At S404, a set S associated with tokens $T_1$ through $T_n$, may be maintained (with each token being associated with an upstream artifact). If no token $T_x$ has changed position in S406, the process simply continues at S404 (waiting for a token to change position). Note that the number of tokens in that set may vary from (1) the progress the process has made and (2) the underlying process model. For example, when the example process initially starts at the start event, only a single upstream token exists. Thus, set S contains only that single token. Once the process progresses to the parallel spilt, set S grows to three tokens—one for each parallel branch. That is, in S406 not only the position changes of existing tokens are tracked but also token creations and deletions.

When it is determined at S406 that a token $T_x$ has changed its position from a "before" artifact to an "after" artifact (note that the term "upstream" may refer to the context of a specific token synchronization gateway and different token synchronization gateways may have different upstream and final token positions), it is decided whether the before artifact is not upstream and the after artifact is upstream in 410. The outbound arrow from S410 may according to some embodiments be directly pointing to S404 avoiding S416 (which would never hold true for this token). In other words, it may be decided whether a new artifact has appeared upstream. If so, token $T_x$ is inserted into set S. It is also decided at S412 whether the before artifact is upstream and the after artifact is not upstream (that is, a token upstream has disappeared). Responsive to said detecting, token $T_x$ is removed from the set S at S414.

Figure 5:
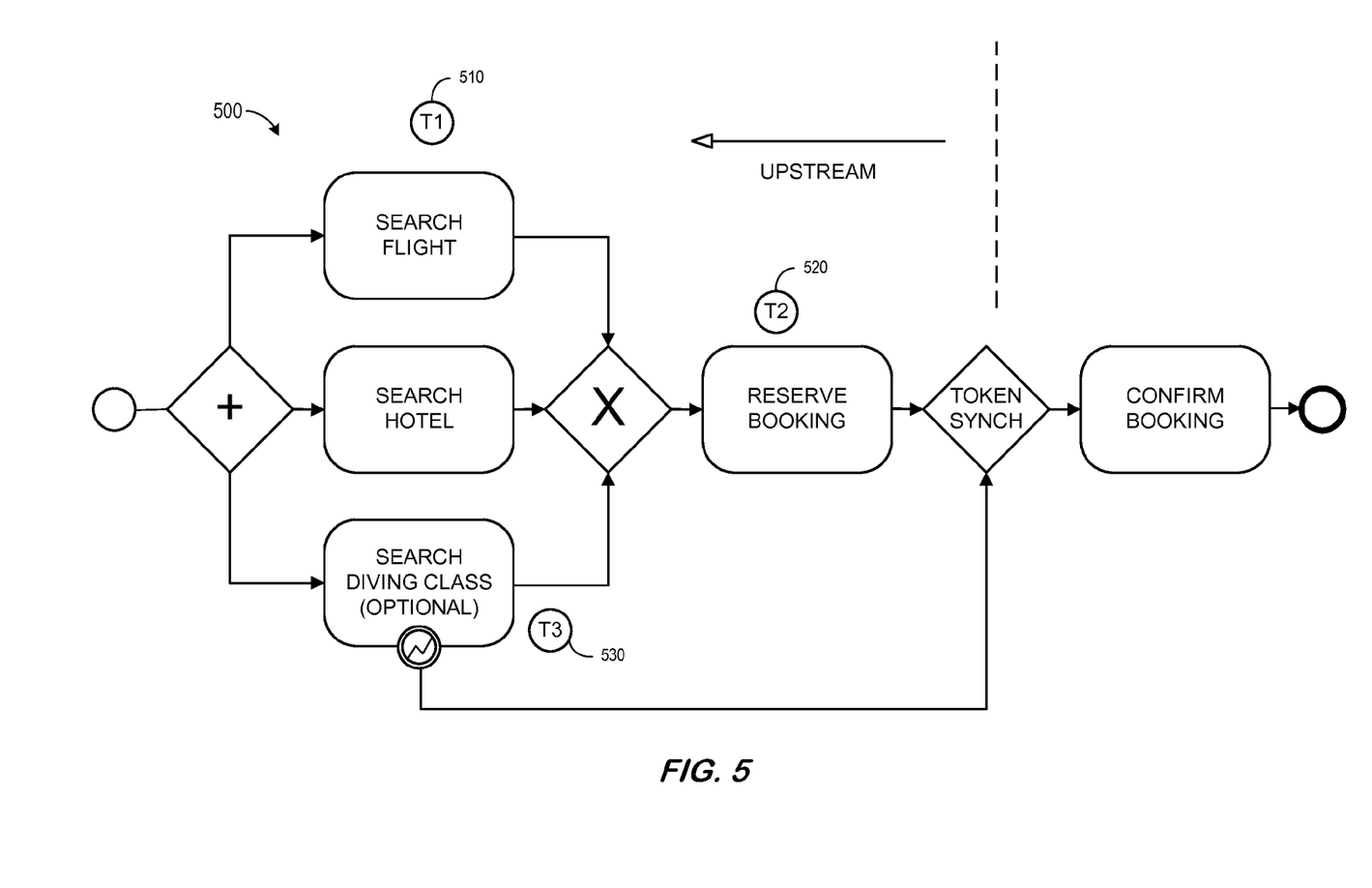
FIG. 5 is a block diagram illustrating tokens for a business process modeling notation model according to some embodiments.

Consider, for example, FIG. 5 which is a block diagram 500 illustrating tokens for a BPMN model according to some embodiments. In particular, token $T_1$ (510) is located at the search flight activity, token $T_2$ (520) is located at the reserve booking activity and token $T_3$ (530) is located at the search driving class activity. The tokens 510, 520, 530 travel to the right of the FIG. as the artifacts are processed. Only when all three tokens complete the reserve booking activity will the token synchronization gateway proceed to the confirm booking activity. This is accomplished as follows.

It is then determined at S416 whether or not (1) the after artifact of a token that has changed its position (e.g., moved forward) is the "final" artifact and (2) the set S is currently empty. That is, it is decided if the last outstanding token indicates that it has completed all upstream processing. If either of these conditions are not true, the process continues at S404. When both of the conditions are true and DONE equals "false" at S418, the Boolean DONE value is set to true (to indicate that all processing has been completed) and token Tx is placed behind the token synchronization gateway at S420. If both of the conditions are true and DONE already equals "true" at S418, the token $T_x$ is simply deleted at S422.

In this way, the lazy approach may be implemented for a token synchronization gateway. Note that lazy approach may make sure all upstream activities are completed before any downstream activity is triggered. The eager approach may trigger downstream activities as soon as the first token arrives at the token synchronization gateway. All other upstream tokens may continue to process their upstream activities but will not trigger any downstream activities (behind the token synchronization gateway). Turning now to the eager approach to token synchronization, a first rule ("initiate") may create a new synchronizer instance for the scope and place a new token on the outbound branch when there is a token on the inbound branch that belongs to some scope and there is not yet a synchronizer instance for this scope and gateway. A second rule may "swallow" (delete) a token if this token is on the inbound branch and belongs to the same scope (associated with a process or sub-process instance) as some synchronizer object for this gateway. A third rule may "reset" the synchronizer object when there are no more tokens upstream (or directly on the gateway's inbound branch).

Figure 6:
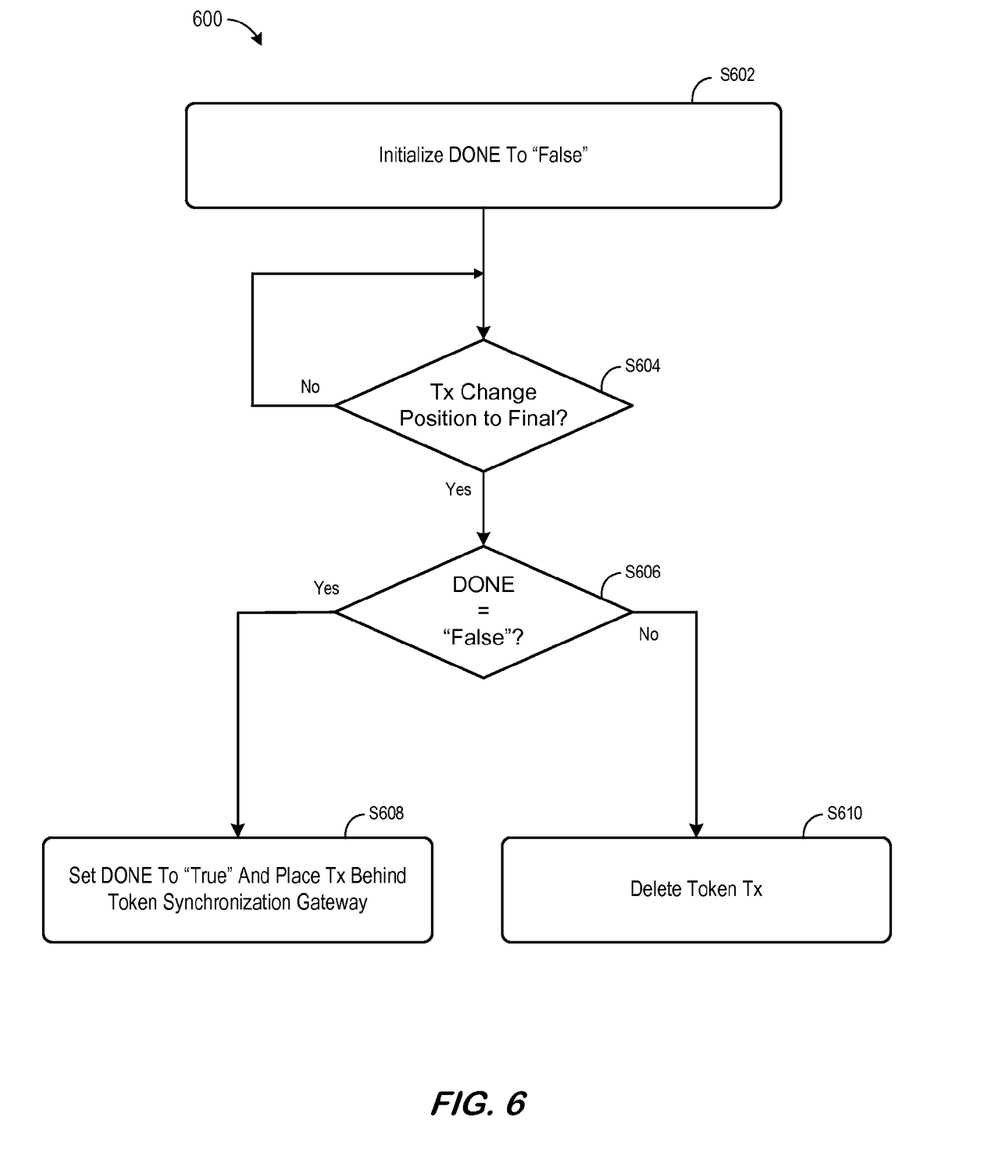
FIG. 6 is a flow diagram of an eager synchronization process in accordance with some embodiments.

For example, FIG. 6 is a flow diagram of an eager synchronization process 600 in accordance with some embodiments. That is, the handling of the tokens will indicate that the token synchronization gateway is done (e.g., has forwarded a single token downstream from the token synchronization gateway) when any upstream token is completed. At S602, a DONE Boolean variable may be initialized to false. At S604, it is determined if any token $T_x$ has changed its position to the final artifact. If not, the process continues to wait.

When it is detected that a token $T_x$ has changed its position to the final artifact at S604, it is determined whether or not the DONE Boolean variable currently equals "false" at S606. If the DONE variable does currently equal false, it is changed to "true" at S608 (indicating that at least one artifact has completed processing) and a token may be placed at a position behind the token synchronization gateway. If the DONE variable already equals "true" at S606, the token $T_x$ may simply be deleted (swallowed by the token synchronization gateway).

Figure 7:
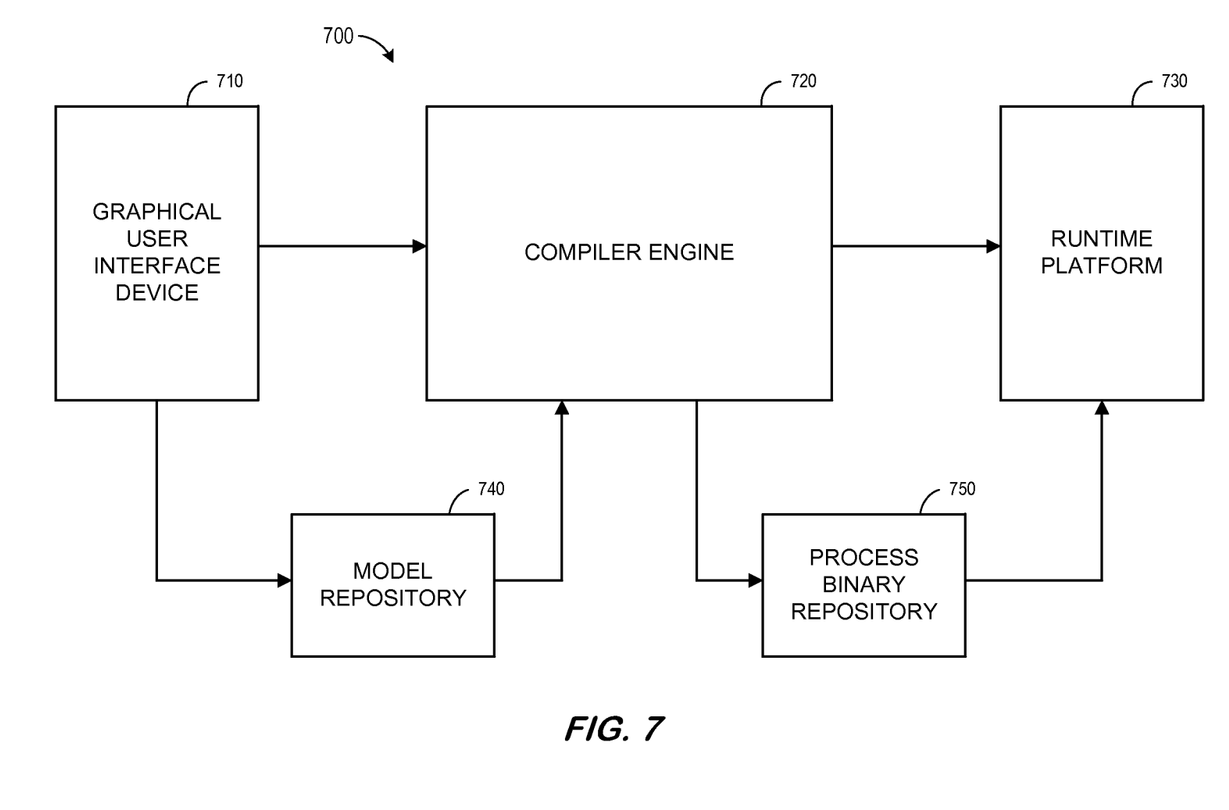
FIG. 7 is a block diagram of a system according to some embodiments.

The methods described herein may be implemented using any of a number of different systems. For example, FIG. 7 is a block diagram of a system 700 according to some embodiments. The system 700 includes a GUI device 710 that may facilitate the creation of a BPMN model or diagram, including one or more token synchronization gateways. Information about the model may be provided to a compiler engine 720 (e.g., executing algorithms illustrated in FIG. 3) that may compile the model into runtime code that is provided to a runtime platform 730 (e.g., executing algorithms illustrated in FIGS. 4 and 6). For example, the compiler engine 720 may recognize a token synchronization gateway in a BPMN model, and then identify n upstream artifacts located upstream from the token synchronization gateway in the model. The compiler engine 720 may also identify a final artifact directly in front of the token synchronization gateway, and compile the token synchronization gateway into a runtime code to perform a synchronization process. Such a synchronization process might include, according to some embodiments, handling tokens $T_1$ through $T_n$ to help synchronize the n upstream artifacts, with each token being associated with one of the identified n upstream artifacts.

According to some embodiments, the GUI device may store models into a model repository 740. The compiler 720 may retrieve the models from the model repository 740, compile them as appropriate, and store the result into a process binary repository 750. The runtime platform 730 can retrieve the data from the process binary repository 750 and execute the code as appropriate.

According to some embodiments, the GUI device 710, compiler engine 720, and/or the runtime platform 730 may represent a single computing device. According to other embodiments, elements of the system 700 may exchange via HyperText Transport Protocol ("HTTP") communication or any other type of data exchange. The GUI device 710, compiler engine 720, and/or the runtime platform 730 might be associated with, for example, Personal Computers (PC), servers, and/or mobile devices.

Note that FIG. 7 represents one logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. Embodiments are therefore not limited to any specific combination of hardware and software.

Moreover, note that token handling approaches may be implemented other than those described in connection with FIGS. 3, 4, and 6. For example, a token synchronization gateway might flexibly support configurations in between the "eager" and "lazy" synchronization approaches. For example, a variant may forward a single token to the downstream flow when three out of n tokens have arrived in the final artifact (in front of the token synchronization gateway). Moreover, by conditionally passing a token to the outbound edge, the gateway might include the current process state (i.e., the currently assigned values of its state variables) into the synchronization criterion. For example, a token synchronization gateway could, in this way, pass on a token to the outbound edge as soon as some business goal has been achieved. The token synchronization gateway might even be configured to pass multiple tokens to the outbound edge. For example, a token synchronization gateway could trigger a downstream flow for every n-th token that appears on the inbound edge.

According to some embodiments, rules associated with a token synchronization gateway may be implemented using a Rete-like algorithm, where a constant number of O(1) operators may be connected with a constant O(1) in the eager approach or a linear O(N) number of connections and in the lazy approach, where N is the number of upstream states. To do so, some embodiments may translate statically (e.g., at build or compile time) and analyze the control flow graph to determine the upstream token positions using a plain depth-first search algorithm. If the token synchronization gateway is placed in a cycle (e.g., downstream control flow branches are re-directed to an upstream branches), any downstream position that may be re-directed to an upstream position can be included in the number of upstream states. These upstream token positions may then be used to hold back token synchronization (via a "synchronize" rule) and token synchronization gateway reset (via a "reset" rule) whenever there are pending upstream tokens. Note that any number of other approaches (e.g., set theory algorithms) may be used in accordance with embodiments described herein.

Thus, embodiments may provide an efficient and automatic complement to the BPMN feature set. By implicitly synchronizing a dynamic number of tokens on a single control flow branch (without requiring the actual number of tokens to be explicitly known), some embodiments may reliably clean up pending tokens without any particular design time or runtime knowledge. Moreover, some embodiments may provide a missing artifact in the BPMN modeling standard where non-block-structured flows may easily generate multiple tokens for a single control flow branch that cannot be synchronized with the existing BPMN feature set. In that sense, the token synchronization gateway may help take advantage of BPMN's expressiveness and flexibility where a control flow can be arbitrarily split and merged without adhering to block structures. Without such a token synchronization gateway, these cases could result in erroneous situations, including an unwanted manifold execution of activities (correctness, where the process may not behave as intended) and/or deadlocks (where the process fails to terminate).

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, comprising:
    recognizing a token synchronization gateway in a graph-based business process model;
    identifying n upstream artifacts located upstream from the token synchronization gateway in the graph-based business process model, n being an integer;
    identifying a final artifact directly in front of the token synchronization gateway; and
    compiling, by a computer processor of a compiler engine, the token synchronization gateway into code to be executed at runtime to perform a synchronization process, the synchronization process including:
    handling tokens $T_1$ through $T_n$ to synchronize the n upstream artifacts, each token being associated with one of the n upstream artifacts, wherein said handling of the tokens comprises:
        indicating that the token synchronization gateway is done when all upstream tokens are completed as indicated by arrival at the final artifact,
        initializing a done Boolean variable, able to have either a first or second value, to the first value,
        maintaining a set S associated with tokens T1 through Tn,
        determining that a token Tx has changed its position from a before artifact to an after artifact,
        determining that the after artifact is the final artifact and that the set S is empty,
        if done currently equals the first value, setting the done Boolean value to the second value and positioning Tx behind the token synchronization gateway, and
        if done currently equals the second value, deleting token Tx.

2. The method of claim 1, wherein said identifying is associated with a depth-first search algorithm graph analysis.

3. The method of claim 1, wherein said maintaining further comprises:
    detecting that the before artifact is not upstream and the after artifact is upstream; and
    responsive to said detecting, inserting token $T_x$ into the set S.

4. The method of claim 1, wherein said maintaining further comprises:
    detecting that the before artifact is upstream and the after artifact is not upstream; and
    responsive to said detecting, removing token $T_x$ from the set S.

5. The method of claim 1, wherein said handling is associated with event-condition-action rules and an action script that updates a state variable.

6. A non-transitory, computer-readable medium storing program code executable by a computer to perform a method, said method comprising:
- recognizing a token synchronization gateway in a graph-based business process model;
- identifying n upstream artifacts located upstream from the token synchronization gateway in the graph-based business process model, n being an integer;
- identifying a final artifact directly in front of the token synchronization gateway; and
- compiling, by a computer processor of a compiler engine, the token synchronization gateway into code to be executed at runtime to perform a synchronization process, the synchronization process including:
  - handling tokens $T_1$ through $T_n$ to synchronize the n upstream artifacts, each token being associated with one of the n upstream artifacts, wherein said handling of the tokens comprises:
    - indicating that the token synchronization gateway is done when all upstream tokens are completed as indicated by arrival at the final artifact,
    - initializing a done Boolean variable, able to have either a first or second value, to the first value,
    - maintaining a set S associated with tokens T1 through Tn,
    - determining that a token Tx has changed its position from a before artifact to an after artifact,
    - determining that the after artifact is the final artifact and that the set S is empty,
    - if done currently equals the first value, setting the done Boolean value to the second value and positioning Tx behind the token synchronization gateway, and
    - if done currently equals the second value, deleting token Tx.

7. The medium of claim 6, wherein said identifying is associated with a depth-first search algorithm graph analysis.

8. The medium of claim 6, wherein said maintaining further comprises:
- detecting that the before artifact is not upstream and the after artifact is upstream; and
- responsive to said detecting, inserting token $T_x$ into the set S.

9. The method of claim 6, wherein said maintaining further comprises:
- detecting that the before artifact is upstream and the after artifact is not upstream; and
- responsive to said detecting, removing token $T_x$ from the set S.

10. The medium of claim 6, wherein said handling is associated with event-condition-action rules and an action script that updates a state variable.

11. A system, comprising:
- an input to receive information associated with a graph-based business process model;
- an output to provide information associated with runtime code; and
- a compiler engine to:
  - recognize a token synchronization gateway in the graph-based business process model,
  - identify n upstream artifacts located upstream from the token synchronization gateway in the graph-based business process model, n being an integer,
  - identifying a final artifact position directly in front of the token synchronization gateway, and
  - compile, by a computer processor of said compiler engine, the token synchronization gateway into the runtime code to perform a synchronization process, the synchronization process including:
    - handling tokens $T_1$ through $T_n$ to synchronize the n upstream artifacts, each token being associated with one of the n upstream artifacts, wherein said handling of the tokens comprises:
      - indicating that the token synchronization gateway is done when all upstream tokens are completed as indicated by arrival at the final artifact,
      - initializing a done Boolean variable, able to have either a first or second value, to the first value,
      - maintaining a set S associated with tokens T1 through Tn,
      - determining that a token Tx has changed its position from a before artifact to an after artifact,
      - determining that the after artifact is the final artifact and that the set S is empty,
      - if done currently equals the first value, setting the done Boolean value to the second value and positioning Tx behind the token synchronization gateway, and
      - if done currently equals the second value, deleting token Tx.

12. The system of claim 11, further comprising at least one of: (i) a graphical user interface device providing the associated with a graph-based business process model to the input, or (ii) a runtime platform to receive the runtime code from the output.

13. The system of claim 11, wherein said identifying is associated with a depth-first search algorithm graph analysis.

14. The system of claim 11, wherein said maintaining further comprises:
- detecting that the before artifact is not upstream and the after artifact is upstream; and
- responsive to said detecting, inserting token $T_x$ into the set S.

15. The system of claim 11, wherein said maintaining further comprises:
- detecting that the before artifact is upstream and the after artifact is not upstream; and
- responsive to said detecting, removing token $T_x$ from the set S.

16. The system of claim 11, wherein said handling is associated with event-condition-action rules and an action script that updates a state variable.

* * * * *